United States Patent [19]

Nakajima

[11] Patent Number: 5,526,139
[45] Date of Patent: Jun. 11, 1996

[54] IMAGE READ-OUT APPARATUS

[75] Inventor: Nobuyoshi Nakajima, Kanagawa-ken, Japan

[73] Assignee: Fuji Photo Film Co., Ltd., Kanagawa, Japan

[21] Appl. No.: 593,924

[22] Filed: Oct. 5, 1990

[30] Foreign Application Priority Data

Oct. 9, 1989 [JP] Japan ................................. 1-263430

[51] Int. Cl.$^6$ ................................ H04N 1/40; H04N 1/21
[52] U.S. Cl. ........................... 358/444; 358/448; 358/474
[58] Field of Search ...................................... 358/401, 404, 358/426, 444, 448, 474, 501, 523, 524, 530; 250/337, 327.1

[56] References Cited

U.S. PATENT DOCUMENTS

| | | | |
|---|---|---|---|
| 4,258,264 | 3/1981 | Kotera et al. | 250/327.1 |
| 4,276,473 | 6/1981 | Kato et al. | 250/327.1 |
| 4,315,318 | 2/1982 | Kato et al. | 250/337 |
| 4,387,428 | 6/1983 | Ishida et al. | 250/337 |
| 4,700,299 | 10/1987 | Kimura et al. | 358/111 |
| 4,768,099 | 8/1988 | Mukai | 358/403 |
| 4,899,049 | 2/1990 | Hishinuma | 250/327.2 |

FOREIGN PATENT DOCUMENTS

| | | | |
|---|---|---|---|
| 56-11395 | 2/1981 | Japan | G21K 4/00 |
| 61-5193 | 2/1986 | Japan | G06f 15/62 |

*Primary Examiner*—Scott A. Rogers
*Assistant Examiner*—Jerome Grant, II
*Attorney, Agent, or Firm*—Sughrue, Mion, Zinn, Macpeak & Seas

[57] ABSTRACT

An image read-out apparatus comprises an image read-out section provided with a read-out device for detecting image signals representing images from recording media, on which the images have been recorded, and an input device, with which information about the kinds of the images is entered. The image read-out apparatus also comprises a first image signal storing section provided with a first storage device, which stores the image signals regardless of the kinds of the images. At least a single second image signal storing section is located which is provided with a second storage device for selectively storing only the image signals corresponding to a specific kind among the plurality of the kinds.

16 Claims, 4 Drawing Sheets

IMAGE READ-OUT APPARATUS

BACKGROUND OF THE INVENTION

Field of the Invention

This invention relates to an image read-out apparatus for obtaining an image signal representing an image from a recording medium, on which the image has been recorded, and storing the image signal.

Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61 (1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used to reproduce the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In the radiation image recording and reproducing systems described above, after an image signal is obtained by reading out an image from a recording medium, such as X-ray film or a stimulable phosphor sheet, on which the image has been recorded, the image signal is ordinarily stored on a storage medium, such as an optical disk operated with an optical disk drive unit.

In general, during the image read-out operations, a plurality of image signals obtained have heretofore been stored in the sequence, with which they are obtained, on optical disks, or the like. In such cases, it often occurs that a plurality of the image signals representing a plurality of images, which are to be compared with one another, are stored on different optical disks. Therefore, a long time has heretofore been required for the image signals to be retrieved.

Also, in general, when image signals are stored on storage media, signal compression processing is carried out on the image signals in order to reduce the amounts of the image signals. In order for the signal storing cost to be kept low, it is required that the image signals, which are expected to be retrieved less frequently (for example, the image signals for which a storage period of as long as several months has occurred), should be subjected to irreversible signal compression processing. With the irreversible signal compression processing, the amounts of the image signals can be reduced markedly. It is also required that the image signals, which are expected to be retrieved more frequently (for example, the image signals which have been obtained during several recent months), should be subjected to reversible signal compression processing. With the reversible signal compression processing, the image quality of a visible image reproduced from the compressed image signal can be kept good. However, in cases where a plurality of image signals obtained from the image read-out operations are stored in the sequence, with which they are obtained, on optical disks, or the like, such requirements cannot be satisfied.

SUMMARY OF THE INVENTION

The primary object of the present invention is to provide an image read-out apparatus wherein the time required for image signals, which have been obtained from image read-out operations, to be retrieved is kept short, and an appropriate signal compression processing method is selected in accordance with how frequently the image signals will be retrieved.

Another object of the present invention is to provide an image read-out apparatus wherein the image signals, which have been obtained from image read-out operations, are compressed such that their amounts may be reduced markedly and the image quality of visible images reproduced from the compressed image signals may be kept good.

Figure 1A:
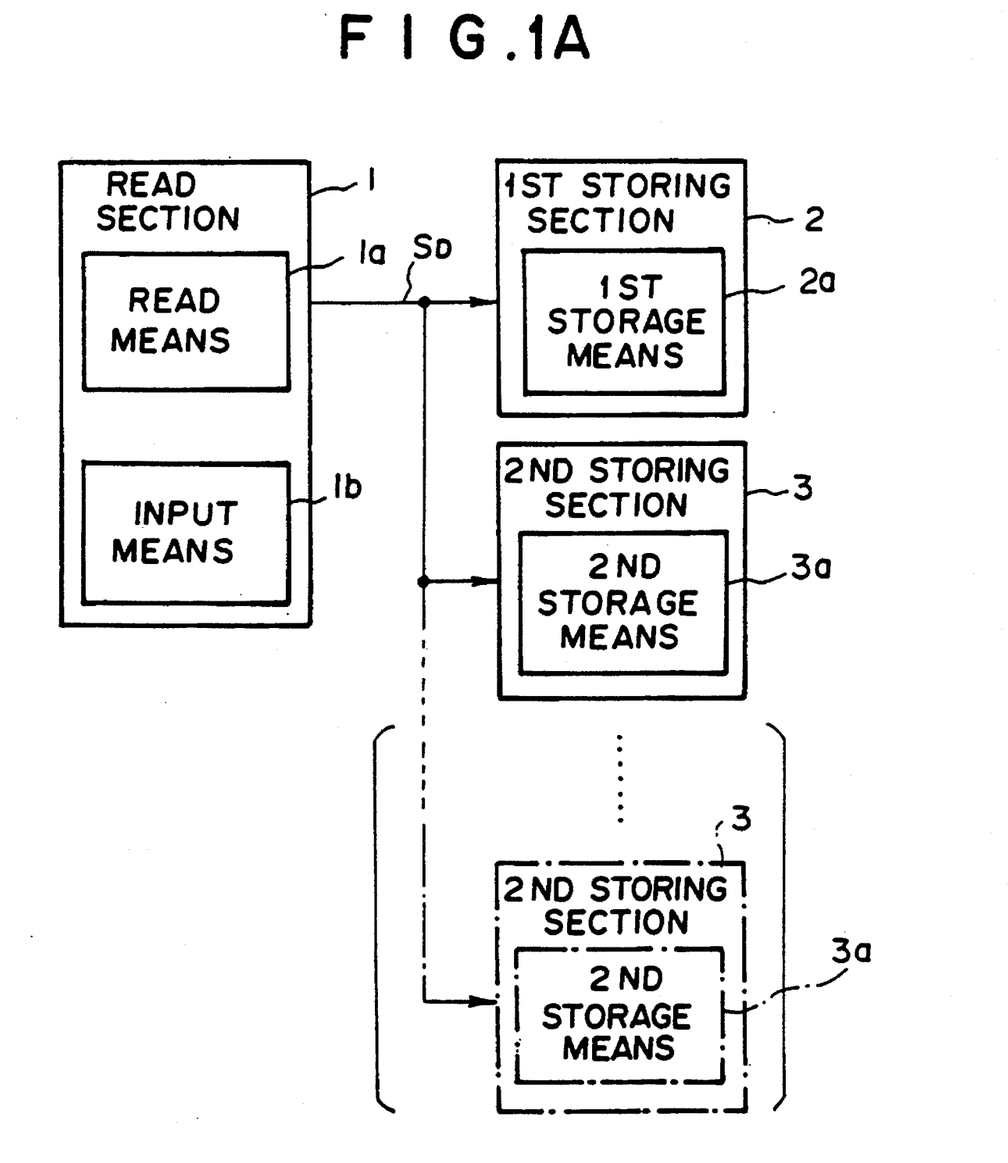
FIG. 1A is a block diagram showing the configuration of the first image read-out apparatus in accordance with the present invention.

FIG. 1A is a block diagram showing the configuration of a first image read-out apparatus in accordance with the present invention.

The first image read-out apparatus in accordance with the present invention comprises an image read-out section 1, a first image signal storing section 2, and a single second image signal storing section 3 or a plurality of second image signal storing sections 3, 3, . . . The image read-out section 1 is composed of a readout means 1a and an input means 1b. The read-out means 1a detect image signals representing images from recording media, on which the images have been recorded. From the input means 1b, information about the kinds of images is entered. No limitation is imposed on the kinds of images. By way of example, in cases where the images are medical images, the term "kind of an image" as used herein means the branch of medicine, the name of a doctor who will diagnose the image, the portion of an object the image of which was recorded, the name of a disease which is to be diagnosed, or the like. The information about the kind of an image may directly represent the kind or may represent a code representing the kind.

A plurality of image signals SD, SD, . . . obtained from the image read-out section 1 are fed to the first image signal storing section 2 and to single second image signal storing section 3 or the plurality of the second image signal storing sections 3, 3, . . .

The first image signal storing section 2 is provided with a first storage means 2a, which stores the plurality of the image signals SD, SD, . . . regardless of the kinds of the images represented by them. The plurality of the image signals SD, SD, . . . , which are fed one after another to the first image signal storing section 2, are sequentially stored in the first image signal storing section 2 regardless of the kinds of the images represented by them. The first storage means 2a may be of such a type that image signals cannot be rewritten, but should preferably have a large storage capacity. By way of example, the first storage means 2a is constituted of optical disks. Also, in order that the amounts of the plurality of the image signals SD, SD, . . . may be reduced markedly, irreversible signal compression processing should preferably be carried out on the plurality of the image signals SD, SD, . . . , and the image signals obtained from the irreversible signal compression processing should preferably be stored on the first storage means 2a.

The second image signal storing section 3 is provided with a second storage means 3a, which selectively stores only the image signals SD, SD, . . . corresponding to a specific kind among the aforesaid kinds of images. By way of example, in cases where the plurality of the image signals SD, SD, . . . are classified in accordance with the branch of medicine, only the image signals SD, SD, . . . corresponding to a specific branch of medicine (e.g. the internal medicine) are selectively stored on the second storage means 3a. In this manner, of the plurality of the image signals SD, SD, . . . fed one after another to the second image signal storing section 3, only the image signals SD, SD, . . . corresponding to a specific kind (e.g. the internal medicine) are selectively stored at the second image signal storing section 3. As described above, the first image read-out apparatus in accordance with the present invention may be provided with the plurality of the second image signal storing sections 3, 3, . . . In such cases, the image signals SD, SD, . . . representing the same kind of images may be stored at different second image signal storing sections 3, 3, . . . Alternatively, the image signals SD, SD, . . . representing different kinds of images may be stored at different second image signal storing sections 3, 3, . . . For example, only the image signals SD, SD, . . . corresponding to the internal medicine may be stored at one of the plurality of the second image signal storing sections 3, 3, . . . , and only the image signals SD, SD, . . . corresponding to the surgery may be stored at one of the other second image signal storing sections 3, 3, . . .

The second storage means 3a should preferably be constituted of a storage medium on which image signals can be rewritten, for example, a magneto-optical disk or a magnetic disk. Also, in order that visible images having good image quality may be reproduced, the image signals SD, SD, . . . should preferably be subjected to reversible signal compression processing, and the image signals obtained from the reversible signal compression processing should preferably be stored on the second storage means 3a. Additionally, the first image read-out apparatus in accordance with the present invention should preferably be provided with a means, with which the image signals stored on the first storage means 2a are transferred to and stored on the second storage means 3a.

Figure 1B:
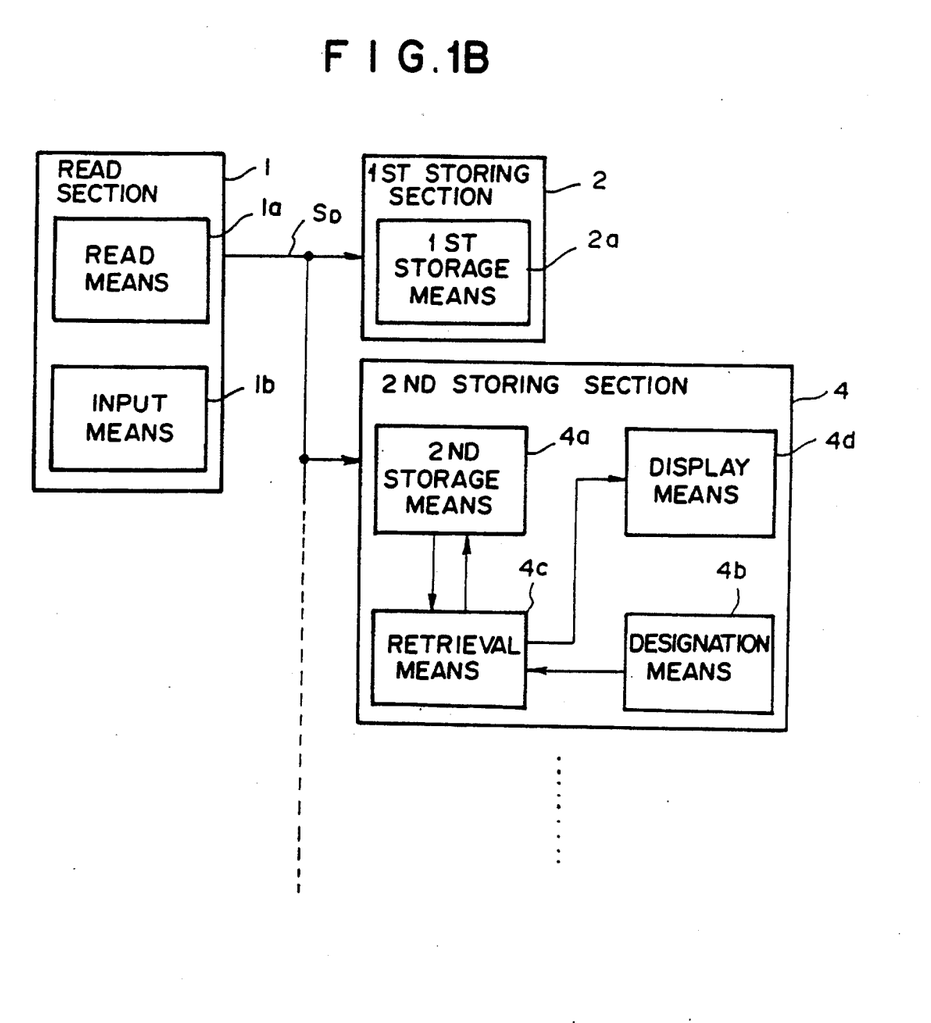
FIG. 1B is a block diagram showing the configuration of the second image read-out apparatus in accordance with the present invention.

FIG. 1B is a block diagram showing the configuration of a second image read-out apparatus in accordance with the present invention. In FIG. 1B, similar elements are numbered with the same reference numerals with respect to FIG. 1A.

The second image read-out apparatus in accordance with the present invention comprises the image read-out section 1, the first image signal storing section 2, and a single second image signal storing section 4 or a plurality of the second image signal storing sections 4, 4, . . .

The image read-out section 1 and the first image signal storing section 2 are constituted in the same manner as those of the first image read-out apparatus in accordance with the present invention, which is shown in FIG. 1A.

The second image signal storing section 4 is composed of a second storage means 4a, a designation means 4b, retrieval means 4c, and display means 4d. The second storage means 4a has the same function as that of the second storage means 3a of the first image read-out apparatus in accordance with the present invention, which is shown in FIG. 1A. The second storage means 4a selectively stores only the image signals SD, SD, . . . corresponding to a specific kind among the aforesaid kinds of images. The designation means 4b designates a desired image among the images represented by the plurality of the image signals, which have been stored on the second storage means 4a. The retrieval means 4c retrieves an image signal representing the desired image, which has been designated by the designation means 4b, from the plurality of the image signals stored on the second storage means 4a. The display means 4d displays a visible image reproduced from the image signal, which has been retrieved by the retrieval means 4c. The second image read-out apparatus in accordance with the present invention should preferably be provided with a means with which, in cases where the image signal representing the desired image, which has been designated by the designation means 4b, is not present on the second storage means 4a, an image signal representing the desired image is retrieved from the first storage means 2a in accordance with, for example, an instruction given from the designation means 4b, and the image signal thus retrieved is transferred to and stored on the second storage means 4a.

As described above, like the first image read-out apparatus in accordance with the present invention, which is shown in FIG. 1A, the second image read-out apparatus in accordance with the present invention may be provided with the plurality of the second image signal storing sections 4, 4, . . . In such cases, the image signals SD, SD, . . . representing the same kind of images may be stored at different second image signal storing sections 4, 4, . . . Alternatively, the image signals SD, SD, . . . representing different kinds of images may be stored at different second image signal storing sections 4, 4, . . .

The first and second image read-out apparatuses in accordance with the present invention are provided with the first image signal storing section 2 and the second image signal storing section 3 or the second image signal storing section 4. Therefore, with first and second image read-out apparatuses in accordance with the present invention, when a desired image is to be reproduced, the retrieval operation for finding the corresponding image signal may be ordinarily carried out only on the image signals stored at the second image signal storing section 3 or the second image signal storing section 4. Accordingly, the time required for the image signal to be retrieved can be kept markedly short.

Also, because the first and second image readout apparatuses in accordance with the present invention are provided with the first image signal storing section 2 and the second image signal storing section 3 or the second image signal storing section 4, an appropriate signal compression processing method can be selected in accordance with how frequently the image signals will be retrieved. For example, irreversible signal compression processing can be carried out on the image signals, which are to be stored at the first image signal storing section 2, in order markedly to reduce the amounts of the image signals. The image signals obtained from the irreversible signal compression processing can then be stored at the first image signal storing section 2. Also, reversible signal compression processing can be carried out on the image signals, which correspond to specific kinds of images and which are expected to be retrieved frequently. The image signals obtained from the reversible signal compression processing can then be stored at the second image signal storing section 3 or the second image signal storing section 4. Accordingly, with the first and second image read-out apparatuses in accordance with the present invention, the image signals, which have been obtained from image read-out operations, can be compressed such that their amounts may be reduced markedly, and the image quality of visible images reproduced from the compressed image signals can be kept good.

DESCRIPTION OF THE PREFERRED EMBODIMENTS

The present invention will hereinbelow be described in further detail with reference to the accompanying drawings.

Figure 2:
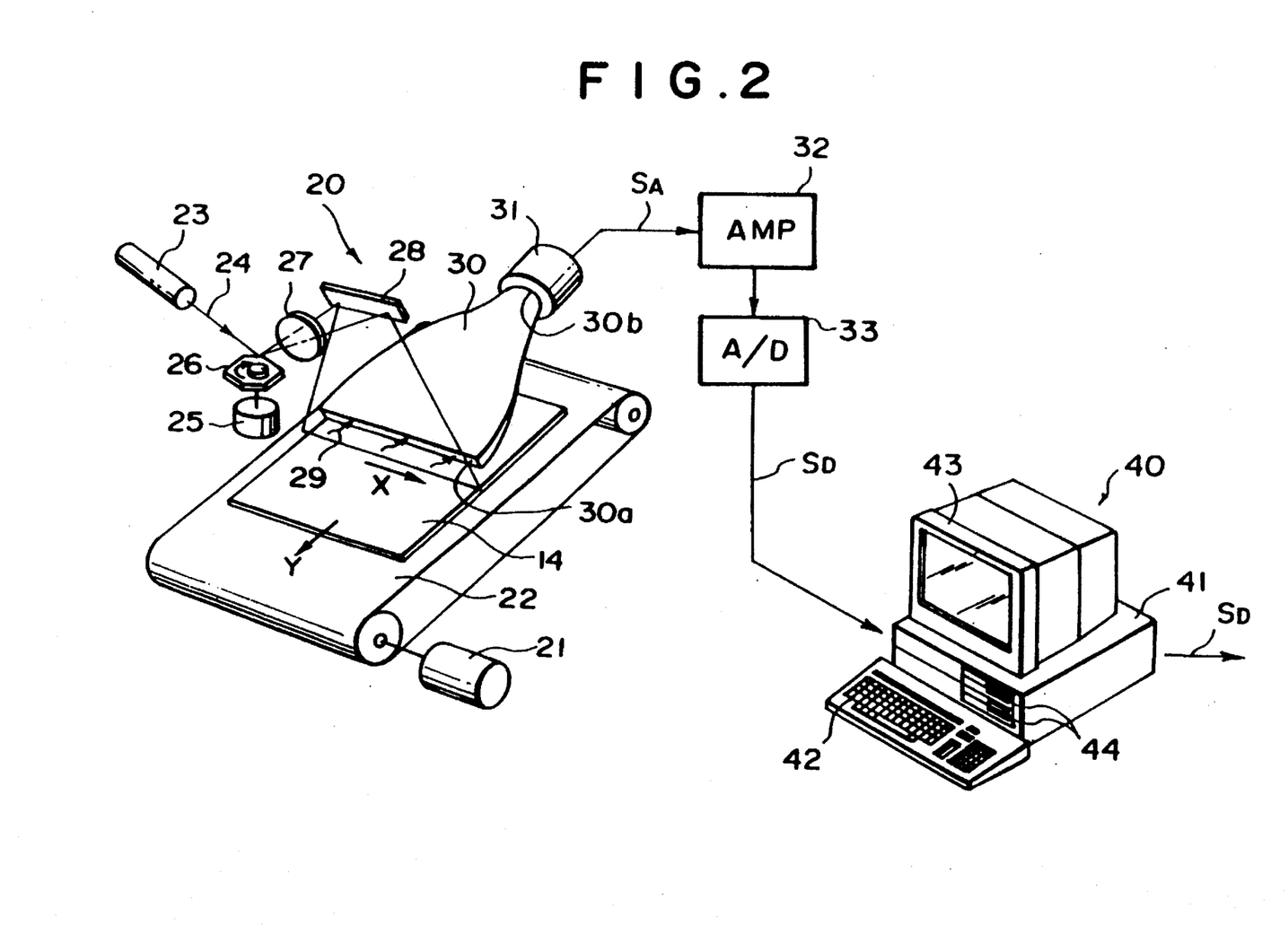
FIG. 2 is a perspective view showing an example of an image read-out section in an embodiment of the image read-out apparatus in accordance with the present invention.

FIG. 2 is a perspective view showing an example of an image read-out section in an embodiment of the image read-out apparatus in accordance with the present invention. In this embodiment, stimulable phosphor sheets are used, and medical X-ray images of human bodies are stored thereon.

With reference to FIG. 2, a stimulable phosphor sheet 14, on which an X-ray image has been stored, is placed at a predetermined position in a readout means 20. The stimulable phosphor sheet 14 is then conveyed in a sub-scanning direction indicated by the arrow Y by a sheet conveyance means 22, which is constituted of an endless belt or the like and which is operated by a motor 21. A laser beam 24, which serves as stimulating rays, is produced by a laser beam source 23, and is reflected and deflected by a rotating polygon mirror 26 which is quickly rotated by a motor 25 in the direction indicated by the arrow. The laser beam 24 then passes through a converging lens 27 constituted of an fθ lens or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the sub-scanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to the X-rays. The emitted light 29 is guided by a light guide member 30 and photoelectrically detected by a photomultiplier 31. The light guide member 30 is made from a light guiding material such as an acrylic plate and has a linear light input face 30a, positioned so that it extends along the main scanning line on the stimulable phosphor sheet 14, and a ring-shaped light output face 30b, positioned so that it is in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which amount represents the X-ray image, is converted into an electric signal by the photomultiplier 31.

An analog output signal SA generated by the photomultiplier 31 is logarithmically amplified by a logarithmic amplifier 32, and digitized by an A/D converter 33 into an electric image signal SD. The image signal SD is then fed into an optical disk drive unit, and first and second magnetic disk drive units, which will be described later, via an interface incorporated in a computer system 40.

The computer system 40 comprises a main body 41 in which a CPU and the aforesaid interface are incorporated, a keyboard 42 from which necessary instructions, or the like, are entered, a CRT display device 43 which displays the information entered from the keyboard 42 and the conditions of the read-out means 20, or the like, and a floppy disk drive unit 44 which operates a floppy disk serving as a subsidiary storage medium.

The keyboard 42 of the computer system 40 constitutes an example of the input means of the image read-out apparatus in accordance with the present invention. From the keyboard 42, information about the kind of an image (in this case, the information about the branch of medicine, such as internal medicine or surgery) is entered. Various other items of information, such as the name of a patient the image of which was recorded, the sex of the patient, the name of a disease which is to be diagnosed, the image recording method used (e.g. plain image recording or contrasted image recording), and the portion of an object the image of which was recorded, are also entered from the keyboard 42. However, in this embodiment, as an aid in facilitating the explanation, the branch of medicine is employed as the kind of an image.

Figure 3:
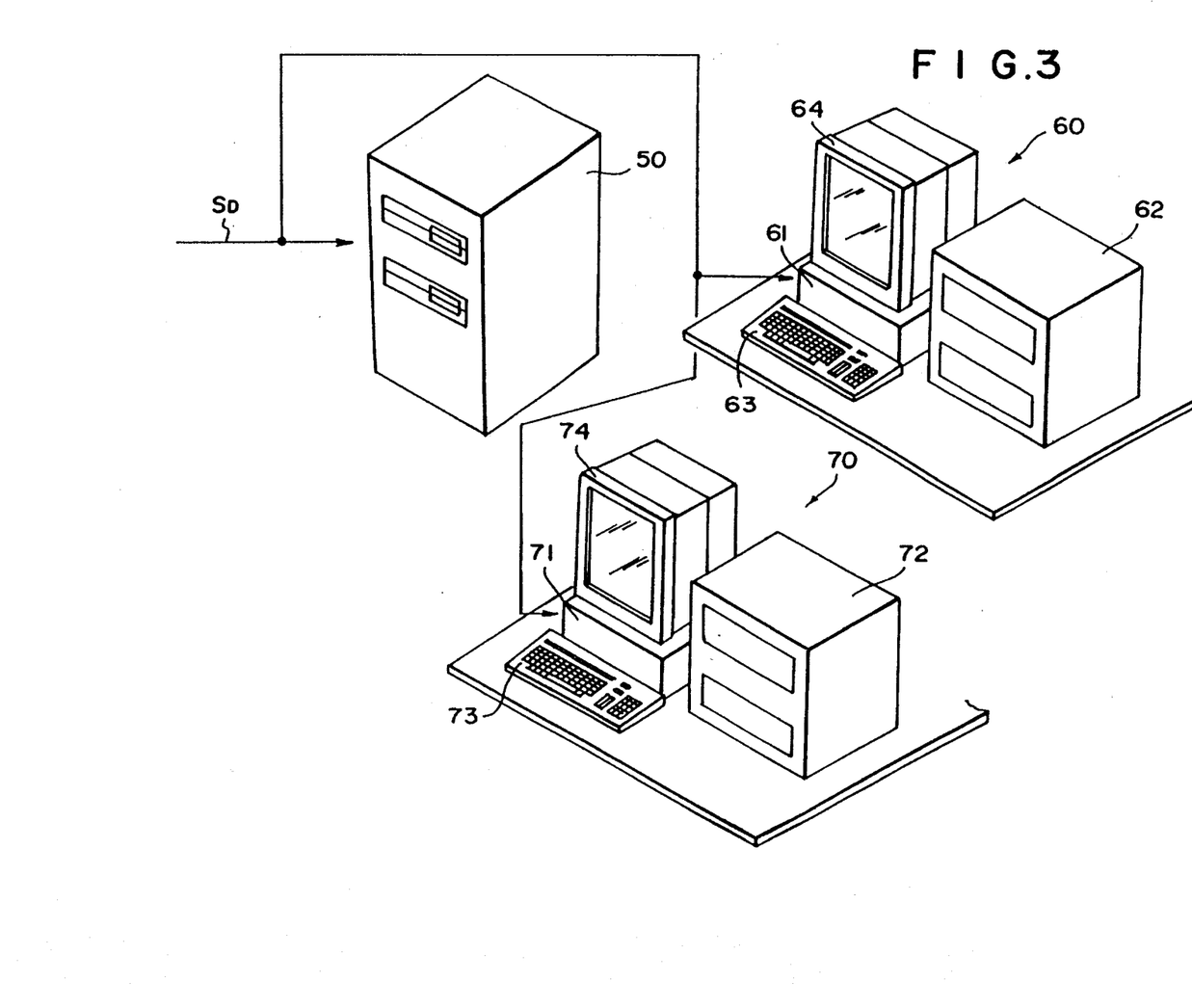
FIG. 3 is a perspective view showing examples of first and second image signal storing sections in the embodiment of the image read-out apparatus in accordance with the present invention.

FIG. 3 is a perspective view showing examples of first and second image signal storing sections in the embodiment of the image read-out apparatus in accordance with the present invention.

With reference to FIG. 3, a plurality of the image signals SD, SD, . . . , which have been obtained from the image read-out section shown in FIG. 2 in the manner described above, are sequentially fed into an optical disk drive unit 50. In the optical disk drive unit 50, the plurality of the image signals SD, SD, . . . are stored on an optical disk. The optical disk drive unit 50 constitutes an example of the first image signal storing section of the image read-out apparatus in accordance with the present invention. The optical disk drive unit 50 is provided with an signal compression processing means, with which the plurality of the image signals SD, SD, . . . are sequentially subjected to irreversible signal compression processing. The image signals obtained from the irreversible signal compression processing are then sequentially stored on the optical disk regardless of the branches of medicine to which the image signals correspond.

The plurality of the image signals SD, SD, . . . , which have been obtained from the image read-out section shown in FIG. 2, are also fed into image diagnosing sections 60 and 70. The image diagnosing sections 60 and 70 constitute examples of the second image signal storing sections of the image read-out apparatus in accordance with the present invention. The image diagnosing section 60 selectively receives only the image signals corresponding to the internal medicine among the plurality of the image signals SD, SD, . . . The image diagnosing section 60 has a main body 61, which is provided with a signal compression processing means. The signal compression processing means carried out reversible signal compression processing on the image signals, which have been received selectively. The image signals obtained from the reversible signal compression processing are fed to a magnetic disk drive unit 62 and stored on a magnetic disk. Also, the image diagnosing section 70 selectively receives only the image signals corresponding to the surgery among the plurality of the image signals SD, SD, . . . The image diagnosing section 70 has a main body 71, which is provided with a signal compression processing means. The signal compression processing means carried out reversible signal compression processing on the image signals, which have been received selectively. The image signals obtained from the reversible signal compression processing are fed to a magnetic disk drive unit 72 and stored on a magnetic disk.

The image diagnosing section 60 is also provided with a keyboard 63 and a CRT display device 64, which displays an image. The image diagnosing section 70 is also provided with a keyboard 73 and a CRT display device 74, which displays an image. Desired image, which are to be displayed respectively on the CRT display devices 64 and 74, are designated from the keyboards 63 and 73. Also, the main body 61 of the image diagnosing section 60 and the main body 71 of the image diagnosing section 70 have the image retrieval functions for retrieving the image signals representing the desired images, which have been designated from the keyboards 63 and 73, from the image signals which have been stored on the magnetic disks in the magnetic disk drive units 62 and 72. The combination of the hardware and software functions for the image retrieval constitutes an example of the retrieval means of the image read-out apparatus in accordance with the present invention.

In the manner described above, the image signals corresponding to the internal medicine are subjected to the reversible signal compression processing, and the image signals obtained from the reversible signal compression processing are stored at the image diagnosing section 60 for the internal medicine. Also, the image signals corresponding to the surgery are subjected to the reversible signal compression processing, and the image signals obtained from the reversible signal compression processing are stored at the image diagnosing section 70 for the surgery. Therefore, when a desired image is to be reproduced and displayed, the image signal representing the desired image can be retrieved quickly, and a visible image can be displayed quickly. Additionally, because the retrieved image signal is the one obtained from the reversible signal compression processing, a visible image having good image quality can be displayed. It may often be required that images represented by the image signals, which have already been erased from the magnetic disks in the magnetic disk drive units 62 and 72 (for example, the image signals which were obtained one year ago from the image read-out operations), should be displayed on the CRT display devices 64 and 74. In cases where instructions requesting the display of such images are designated from the keyboards 63 and 73, the image signals representing such images may be retrieved from the optical disk in the optical disk drive unit 50, and the images may be displayed on the CRT display devices 64 and 74. Also, the image signals thus retrieved may be stored at the magnetic disk drive units 62 and 72.

In the embodiment described above, the image diagnosing sections (i.e. the second image signal storing sections) are provided for the respective branches of medicine. However, as described above, the kind of an image in the image read-out apparatus of the present invention is not limited to the branch of medicine. Also, the number of the image diagnosing sections (i.e. the second image signal storing sections) is not limited to two. Only a single image diagnosing section may be provided. Alternatively, three or more image diagnosing sections may be provided.

Also, in the aforesaid embodiment, stimulable phosphor sheets are used, and medical X-ray images of human bodies are stored thereon. The image read-out apparatus in accordance with the present invention is also applicable when images other than medical X-ray images of human bodies are read out from recording media other than the stimulable phosphor sheets, and the image signals thus obtained are stored.

I claim:

1. An image read-out apparatus comprising:
    i) an image read-out section including:
        a) a read-out means for detecting image signals representing images of different kinds from recording media, on which said images have been recorded, and
        b) an input means, with which information about the different kinds of said images is entered,
        ii) a first image signal storing section provided with a first storage means, which stores said image signals regardless of the kinds of said images, and
        iii) at least a single second image signal storing section provided with a second storage means, which selectively stores only the image signals corresponding to a specific kind among said different kinds,
    wherein said first image signal storing section is also provided with a signal compression processing means, which carries out irreversible signal compression processing on said image signals fed thereto, and said first storage means stores the image signals obtained from the irreversible signal compression processing.

2. An apparatus as defined in claim 1 wherein said second storage means is constituted of a magneto-optical disk or a magnetic disk.

3. An apparatus as defined in claim 1 wherein said recording media are photographic film.

4. An image read-out apparatus comprising:
   i) an image read-out section including:
      a) a read-out means for detecting image signals representing images of different kinds from recording media, on which said images have been recorded, and
      b) an input means, with which information about the different kinds of said images is entered,
   ii) a first image signal storing section provided with a first storage means, which stores said image signals regardless of the kinds of said images, and
   iii) at least a single second image signal storing section provided with a second storage means, which selectively stores only the image signals corresponding to a specific kind among said different kinds,
   wherein said second image signal storing section is also provided with a signal compression processing means, which carries out reversible signal compression processing on said image signals fed thereto, and said second storage means stores the image signals obtained from the reversible signal compression processing.

5. An apparatus as defined in claim 1 wherein said recording media are stimulable phosphor sheets on which radiation images have been stored.

6. An apparatus as defined in claim 5 wherein said read-out means detects an image signal representing a radiation image from a read-out operation wherein a stimulable phosphor sheet is exposed to stimulating rays, which cause said stimulable phosphor sheet to emit light in proportion to an amount of energy stored thereon during exposure to radiation, and the emitted light is detected photoelectrically.

7. An apparatus as defined in claim 6 wherein said stimulating rays are a laser beam.

8. An image read-out apparatus comprising:
   i) an image read-out section including:
      a) a read-out means for detecting image signals representing images of different kinds from recording media, on which said images have been recorded, and
      b) an input means, with which information about the different kinds of said images is entered,
   ii) a first image signal storing section provided with a first storage means, which stores said image signals regardless of the kinds of said images, and
   iii) at least a single second image signal storing section provided with:
      a) a second storage means, which selectively stores only the image signals corresponding to a specific kind among said different kind,
      b) a designation means, with which a desired image is designated,
      c) a retrieval means for retrieving an image signal representing said desired image, which has been designated with said designation means, from a plurality of image signals stored on said second storage means, and
      d) a display means for reproducing a visible image from the image signal, which has been retrieved by said retrieval means, and displaying said visible image,
   wherein said first image signal storing section is also provided with a signal compression processing means, which carries out irreversible signal compression processing on said image signals fed thereto, and said first storage means stores the image signals obtained from the irreversible signal compression processing.

9. An apparatus as defined in claim 8 wherein said second storage means is constituted of a magneto-optical disk or a magnetic disk.

10. An apparatus as defined in claim 8 wherein said recording media are photographic film.

11. An image read-out apparatus comprising:
    i) an image read-out section including:
       a) a read-out means for detecting image signals representing images of different kinds from recording media, on which said images have been recorded, and
       b) an input means, with which information about the different kinds of said images is entered,
    ii) a first image signal storing section provided with a first storage means, which stores said image signals regardless of the kinds of said images, and
    iii) at least a single second image signal storing section provided with:
       a) a second storage means, which selectively stores only the image signals corresponding to a specific kind among said different kinds,
       b) a designation means, with which a desired image is designated,
       c) a retrieval means for retrieving an image signal representing said desired image, which has been designated with said designation means, from a plurality of image signals stored on said second storage means, and
       d) a display means for reproducing a visible image from the image signal, which has been retrieved by said retrieval means, and displaying said visible image,
    wherein said second image signal storing section is also provided with a signal compression processing means, which carries out reversible signal compression processing on said image signals fed thereto, and said second storage means stores the image signals obtained from the reversible signal compression processing.

12. An apparatus as defined in claim 11 wherein said recording media are stimulable phosphor sheets on which radiation images have been stored.

13. An apparatus as defined in claim 12 wherein said read-out means detects an image signal representing a radiation image from a read-out operation wherein a stimulable phosphor sheet is exposed to stimulating rays, which cause said stimulable phosphor sheet to emit light in proportion to an amount of energy stored thereon during exposure to radiation, and the emitted light is detected photoelectrically.

14. An apparatus as defined in claim 13 wherein said stimulating rays are a laser beam.

15. An image read-out apparatus comprising:
    an image read-out section including:
       a) a read-out means for detecting image signals representing images of different kinds from recording media, on which said images have been recorded, and
       b) an input means, with which information about the different kinds of said images is entered,
    ii) a first image signal storing section provided with a first storage means, which stores said image signals regardless of the kinds of said images, and
    iii) at least two second image signal storing sections each having a different second storage means, said second image signal storing sections selectively storing only image signals corresponding to a specific kind among said different kinds, each said different second storage means respectively capable of storing a different specific kind of images among said kinds of images stored in said first image signal storing section.

16. An image read-out apparatus comprising:

i) an image read-out section including:
   a) a read-out means for detecting image signals representing images of different kinds from recording media, on which said images have been recorded, and
   b) an input means, with which information about the different kinds of said images is entered, ii) a first image signal storing section provided with a first storage means, which stores said image signals regardless of the kinds of said images, and iii) at least two second image signal storing sections each provided with:

a) a second storage means, which selectively stores only the image signals corresponding to a specific kind among said different kinds, each said second storage means respectively capable of storing a different specific kind of images among said kinds of images stored in said first image signal storing section,
   b) a designation means, with which a desired image is designated,
   c) a retrieval means for retrieving an image signal representing said desired image, which has been designated with said designation means, from a plurality of image signals stored on said second storage means, and
   d) a display means for reproducing a visible image from the image signal, which has been retrieval means, and displaying said visible image.

\* \* \* \* \*